No. 847,998. PATENTED MAR. 26, 1907.
A. BAKER.
NUT LOCK.
APPLICATION FILED AUG. 28, 1906.
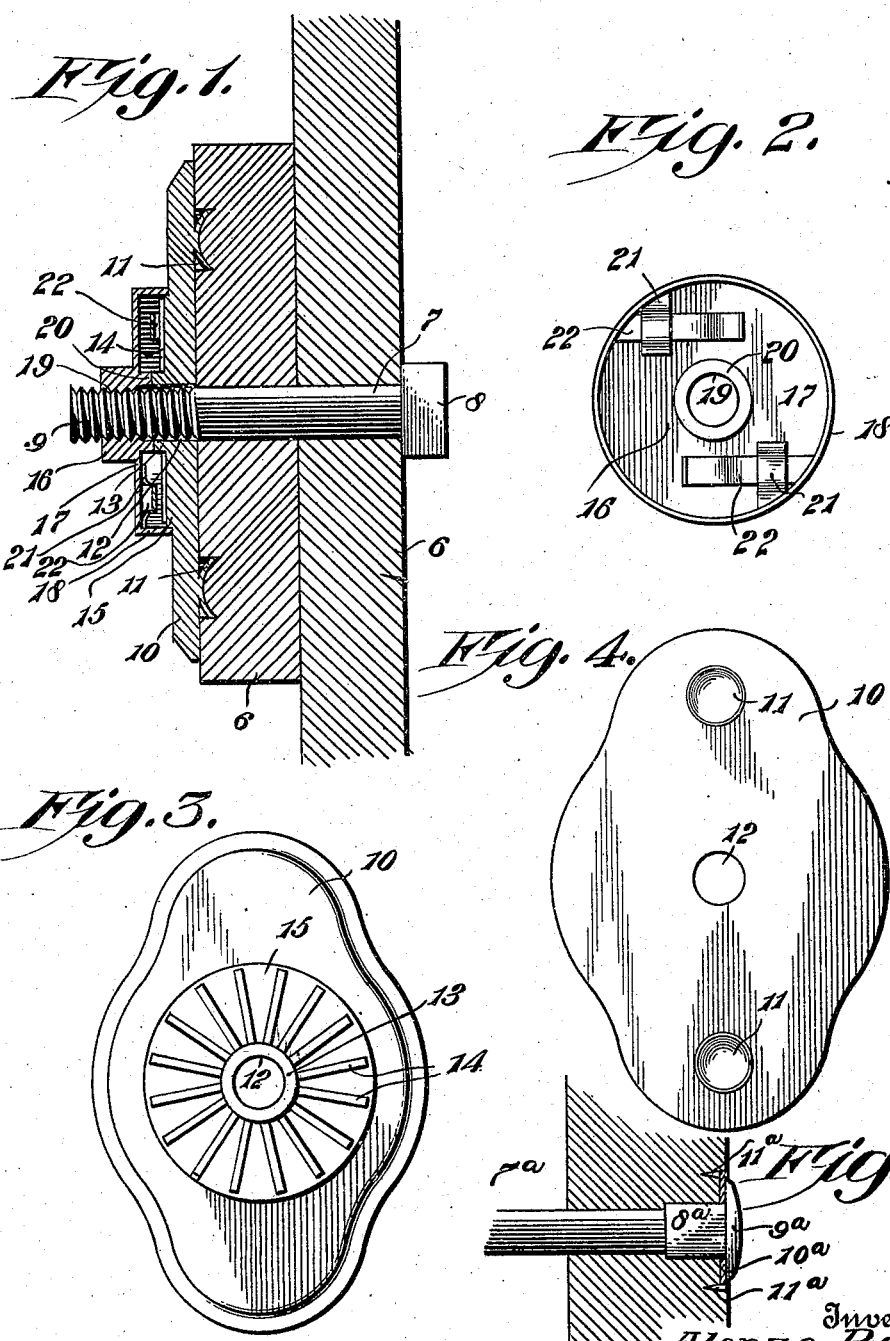

UNITED STATES PATENT OFFICE.

ALONZO BAKER, OF GRANBURY, TEXAS.

NUT-LOCK.

No. 847,998.     Specification of Letters Patent.     Patented March 26, 1907.

Application filed August 28, 1906. Serial No. 332,376.

*To all whom it may concern:*

Be it known that I, ALONZO BAKER, a citizen of the United States, residing at Granbury, in the county of Hood and State of Texas, have invented a new and useful Nut-Lock, of which the following is a specification.

This invention relates to means for locking nuts against retrograde or loosening movements, and the principal object is to provide simple, novel, and effective means, particularly applicable to woodwork, though capable of employment with other materials and especially in railroad work, whereby nuts can be tightened to any extent desired, but will be automatically held against turning in a direction to loosen the same.

The preferred form of construction is illustrated in the accompanying drawings, wherein—

Figure 1 is a sectional view through two members held together by a bolt and showing the novel locking means for the nut thereof. Fig. 2 is a rear elevation of the nut member. Fig. 3 is a front elevation of the base member. Fig. 4 is a rear elevation of the same. Fig. 5 is a detail sectional view showing means for preventing the rotation of the bolt-shank.

Similar reference-numerals designate corresponding parts in all the figures of the drawings.

In the embodiment illustrated the members to be held are designated 6, and may be of any suitable character. A bolt-shank 7 passes therethrough, said shank having a head 8 at one end and a threaded portion 9 at the other end. A base member 10 is employed, which may be of any suitable configuration and is provided on its rear face with suitable anchors 11, that are arranged to embed in one of the articles held, so that rotation of the member will be prevented. The said member is provided with a central opening 12, and a boss 13, located on the outer side of the base member, surrounds said opening. An annular series of radially-disposed teeth 14 surround the boss, being preferably located on a slightly-elevated portion 15.

The nut member is designated 16 and is provided with an enlarged casing 17, that is arranged to inclose the teeth 14, being provided with a circular side wall 18, that engages over the raised portion 15. The nut and central portion of the casing are provided with a bolt-receiving opening 19, and surrounding the inner end of this opening is a boss 20, that is located within the casing. Keeper-loops 21, suitably formed within the casing, constitute holding means for spring-dogs 22, each dog having one end engaged in one of the loops 21 and its other end coöperating with the teeth 14.

In using the device the bolt-shank is passed through the articles to be held, the base member 10 is placed thereon, and the nut screwed home. When properly tightened, the casing will inclose the teeth 14, as already described, and the bosses 13 and 20 will be abutted against each other, so as to prevent the springing of said casing. In this position the dogs 22 will engage the teeth 14, said dogs readily rotating over the teeth while the nut is being tightened, but holding said nut against retrograde movement, as will be apparent. It will thus be seen that the nut will be securely locked against rotation, and if it is desired to move the nut it is necessary to rotate the shank 7 by means of the angular head 8. In case, however, the bolt is to be positively secured against detachment the structure shown in Fig. 5 may be employed. The shank of the bolt is shown at $7^a$ and is provided with an angular portion $8^a$, that is arranged to be sunk into the casing, the head $9^a$ being flattened, as shown. Upon the angular portion $8^a$ is placed a collar or disk $10^a$, which is provided with spurs $11^a$, that embed themselves in the article, said spurs thus preventing the rotation of the disk or collar and in turn preventing the rotation of the bolt-shank.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus fully described my invention, what I claim as new, and desire to secure by Letters Patent, is—

1. In a nut-lock, the combination with a bolt-shank having threads, of a base that fits upon the bolt-shank, a nut that screws upon the shank, teeth located on the outer face of the base that is disposed in opposition to the inner face of the nut, a casing carried by the nut and extending over the teeth of the base, and a dog mounted on the inside of the casing and coacting with the teeth to prevent retrograde movement of the nut.

2. In a nut-lock, the combination with a bolt-shank having threads, of a base that fits upon the bolt-shank, a nut that screws upon the shank, an annular series of teeth projecting in the same direction from the outer face of the base that is disposed in opposition to the rear face of the nut, a casing carried by the nut and extending beyond the sides thereof, said casing inclosing the teeth of the base, and a yielding dog mounted wholly inside the casing and coacting with said teeth to prevent retrograde movement of the nut.

3. In a nut-lock, the combination with a base member having an opening, and a series of teeth surrounding the same and projecting in the same direction therefrom, of a nut member coöperating with the base member, said nut member having an outstanding casing that incloses the teeth and is provided on its inner side with a keeper-loop, and a yielding dog having one end engaged in the keeper-loop, and the other end coöperating with the teeth.

4. In a nut-lock, the combination with a base having a bolt-receiving opening, an outstanding boss surrounding the same, and an annular series of teeth projecting in one direction from the outer face of the base, said teeth being carried by the base and surrounding the boss, of a nut having a casing that incloses the teeth, and a yielding dog located inside the casing and coöperating with the teeth, a portion of said casing engaging the boss.

5. In a nut-lock, the combination with a base having an opening, and an annular series of teeth surrounding the same, of a nut coöperating with the base and having a casing that incloses the teeth, said nut and casing having a bolt-receiving opening, a boss surrounding the bolt-receiving opening and located in the casing, said boss being arranged to abut against the base, and a yielding dog arranged in the casing and coöperating with the teeth of the base.

6. In a nut-lock, the combination with a base having a nut-receiving opening, a boss surrounding the same, and an annular series of teeth surrounding the boss, of a nut, a casing carried by the nut and inclosing the teeth of the base, said casing and nut being provided with a bolt-receiving opening, a boss surrounding the bolt-receiving opening and located in the casing, said boss coöperating with the boss of the base, and keeper-dogs secured within the casing and having free terminals coöperating with the teeth of the base.

In testimony that I claim the foregoing as my own I have hereto affixed my signature in the presence of two witnesses.

ALONZO BAKER.

Witnesses:
K. H. FAULKNER,
LEE CLYATT.